Jan. 31, 1950

P. U. LANNERD 2,496,056

MULTIPLE DISK PHONOGRAPH

Filed Feb. 8, 1946

10 Sheets-Sheet 1

INVENTOR.
PAUL U. LANNERD,

BY Sebley Greeley & Jenkins

ATTORNEYS.

Jan. 31, 1950

P. U. LANNERD 2,496,056

MULTIPLE DISK PHONOGRAPH

Filed Feb. 8, 1946

10 Sheets-Sheet 2

INVENTOR.
PAUL U. LANNERD,
BY
[signature]
ATTORNEYS.

Jan. 31, 1950 P. U. LANNERD 2,496,056

MULTIPLE DISK PHONOGRAPH

Filed Feb. 8, 1946

10 Sheets-Sheet 3

INVENTOR.
PAUL U LANNERD,
BY
[signature]
ATTORNEYS.

INVENTOR.
PAUL U. LANNERD,
BY
[signature]
ATTORNEYS.

Jan. 31, 1950 P. U. LANNERD 2,496,056

MULTIPLE DISK PHONOGRAPH

Filed Feb. 8, 1946 10 Sheets-Sheet 5

INVENTOR.
PAUL U. LANNERD,

BY [signature]
ATTORNEYS.

INVENTOR.
PAUL U. LANNERD,
BY [signature]
ATTORNEYS.

Jan. 31, 1950 P. U. LANNERD 2,496,056

MULTIPLE DISK PHONOGRAPH

Filed Feb. 8, 1946 10 Sheets-Sheet 7

INVENTOR.
PAUL U. LANNERD,
BY
[signature]
ATTORNEYS.

Jan. 31, 1950

P. U. LANNERD 2,496,056

MULTIPLE DISK PHONOGRAPH

Filed Feb. 8, 1946

10 Sheets-Sheet 8

INVENTOR.
PAUL U. LANNERD,
BY
[signature]
ATTORNEYS.

Jan. 31, 1950

P. U. LANNERD 2,496,056

MULTIPLE DISK PHONOGRAPH

Filed Feb. 8, 1946

10 Sheets-Sheet 9

INVENTOR.
PAUL U. LANNERD,
BY
[signature]
ATTORNEYS.

Jan. 31, 1950

P. U. LANNERD 2,496,056

MULTIPLE DISK PHONOGRAPH

Filed Feb. 8, 1946

10 Sheets-Sheet 10

INVENTOR.
PAUL U. LANNERD,
BY
Albey, Brock & Jenkins
ATTORNEYS.

Patented Jan. 31, 1950

2,496,056

UNITED STATES PATENT OFFICE 2,496,056

MULTIPLE DISK PHONOGRAPH

Paul U. Lannerd, Indianapolis, Ind.

Application February 8, 1946, Serial No. 646,451

15 Claims. (Cl. 274—10)

Figure 1:
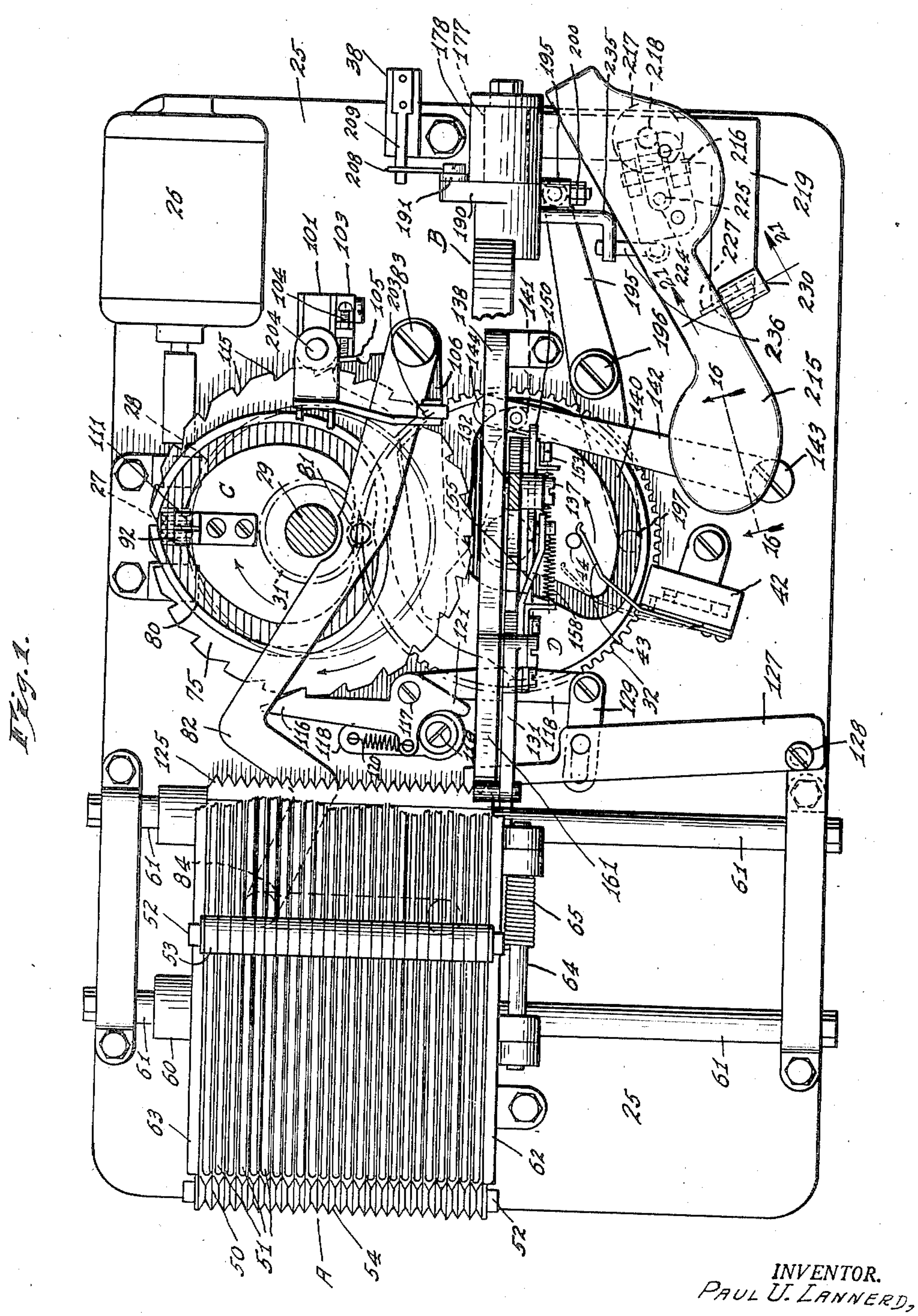

My invention relates to automatic, multi-record phonographs capable of selective operation to play any of a group of records or any plurality of records in such group.

One object of my invention is to provide, in such a phonograph, a novel and improved mechanism for depositing a selected record upon the record-rotating table and for bringing the record into operative association with the needle of a pick-up device. Another object of my invention is to provide an improved mounting for the pick-up device, whereby it may readily be removed and replaced for purposes of inspection and repair. A further object is to facilitate the changing of the records associated with the phonograph.

Still another object of the invention is to produce a simple, compact, and durable record-selecting mechanism embodying a rotatable element which, through selectively operable stop-pins, can be stopped in any position to condition the phonograph for the playing of a selected record. A further object of my invention relates to an improved means for retracting a stop-pin after it has performed its selecting function. An additional object of my invention is to provide a trip mechanism for initiating return of a played record to the magazine, which mechanism will not produce undue wear on the sound track of the record.

Other objects of my invention include a reduction in the time required for a record-changing operation, the production of an improved arrangement of electrical controls, an improved transfer mechanism for removing a record from and returning it to a magazine, a compact and efficient drive for the record-changing mechanism, and an effective and simple device for feeding the pick-up arm inwardly of the record to cause the needle to enter the sound track.

In carrying out my invention in its preferred form a magazine carrying a group of records in vertical positions is removably associated with a reciprocable carrier the movement of which can be interrupted to position any desired record of the group opposite a record-receiver. Interrupting of magazine movement can occur with the magazine moving in either direction, so that the selecting operation is distributed over the entire cycle of magazine movement. The magazine is reciprocated through a rotatable element adapted to be stopped in any of a circumferential series of angularly spaced positions by selectively operable stop pins arranged in a common mounting or head parallel to each other and to the axis of the rotatable element and capable of being projected independently into the path of an abutment carried by the rotatable element. After selective positioning of the magazine has been effected, the head is reciprocated toward and away from the rotatable element, to cause the projected stop pin to be retracted into the head.

Transfer mechanism embodying two successively operable, record-positioning arms transfers the selected record in vertical position from the magazine to a record receiver. The latter comprises a record-support mounted for swinging movement about a horizontal axis and a turntable support pivoted to the record support on an axis parallel to but spaced from the support axis. The receiver is swingable about the support axis between a generally vertical, record-receiving position and a generally horizontal record-playing position. The record turntable is carried by the turntable support and, when the receiver is in receiving position, is located out of the plane of the record placed in the receiver by the transfer mechanism. After receiving a record, the receiver is moved about the support-axis, the record support and turntable support moving as a unit until record-playing position is approached, whereupon the turntable support and record support are caused to move relatively about their axis of pivotal interconnection to cause the record to be transferred from the record support to the turntable and to engage the needle of the pick-up device mounted in a swinging pick-up arm. The pick-up device has a novel mounting which, while concealing and protecting it, facilitates its removal and insertion.

The trip mechanism comprises a tiltable control element unstably mounted with its center of gravity above its axis of pivotal mounting. During the playing of a record, such control element is supported with its center of gravity displaced slightly from the vertical plane of its axis; but as the playing of the record is completed movement of the pick-up arm swings the control element to cause its center of gravity to pass through such vertical plane, whereupon the control element, aided by gravity, will swing further and initiate return of the receiver to record-receiving position and restoration of the played record to the magazine.

Additional features of my invention and the manner in which other objects of my invention are attained will be apparent from the detailed description set forth below.

Figure 2:
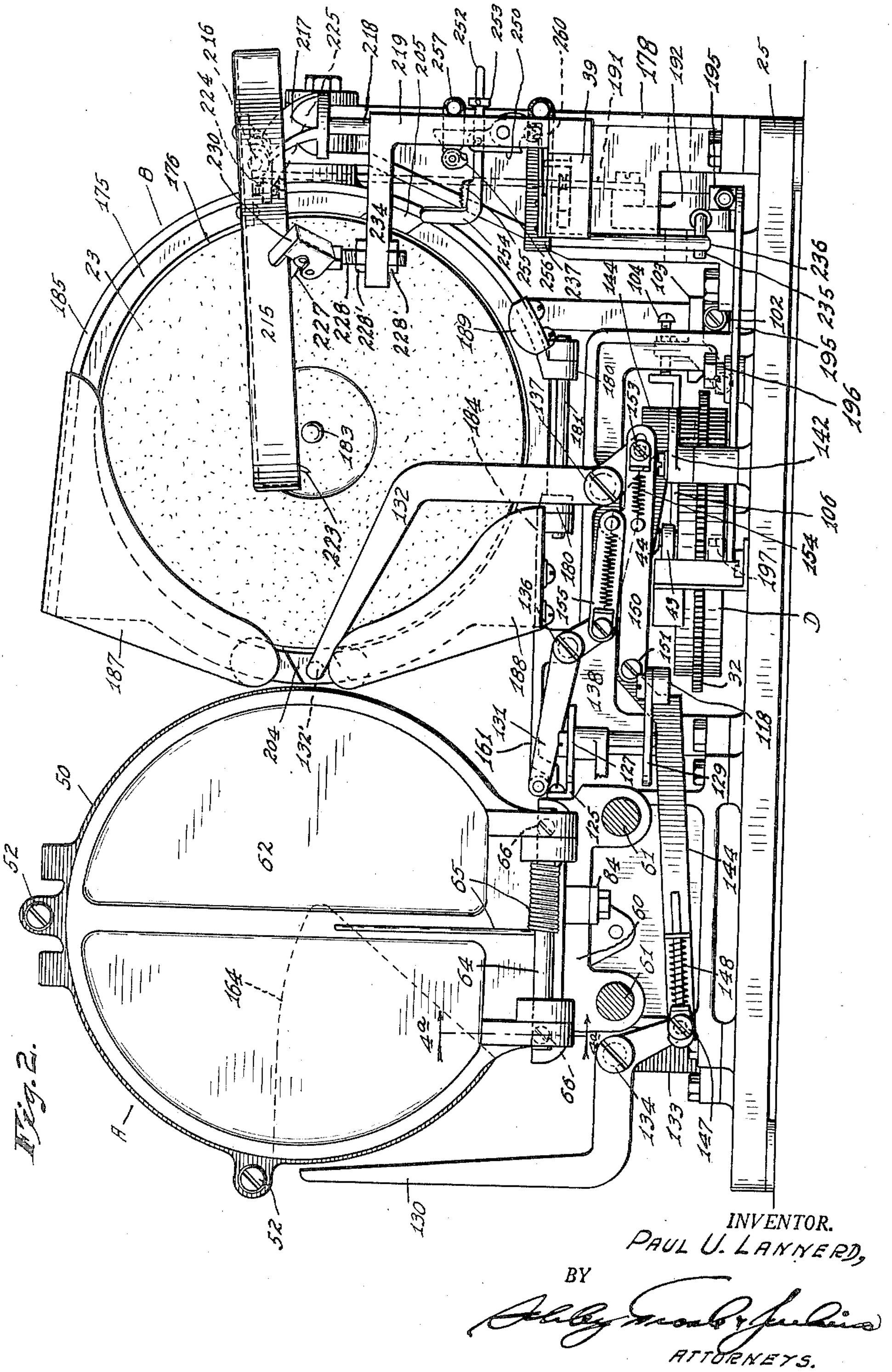
Figure 3:
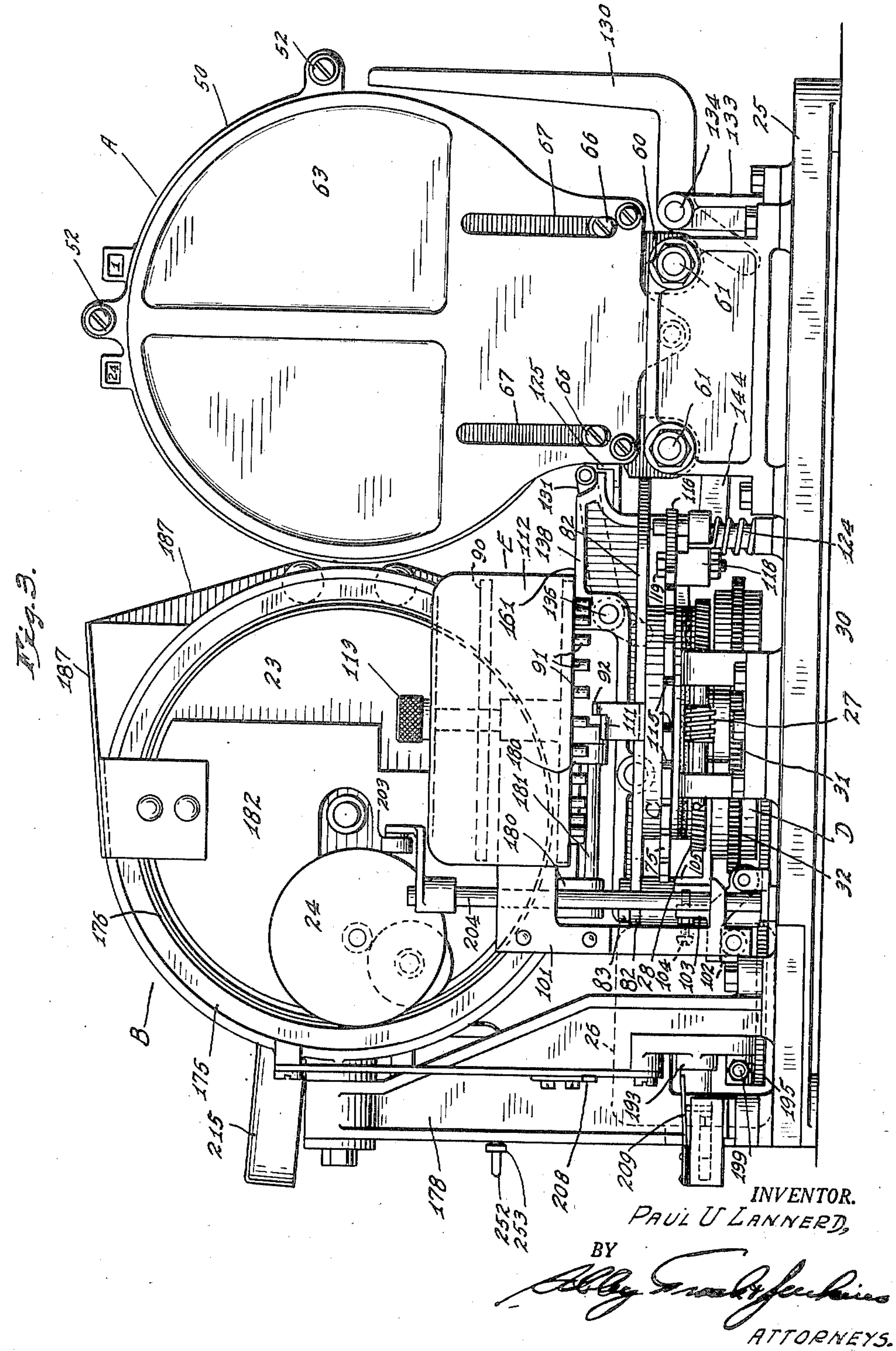
Figures 4, 4A, 21:
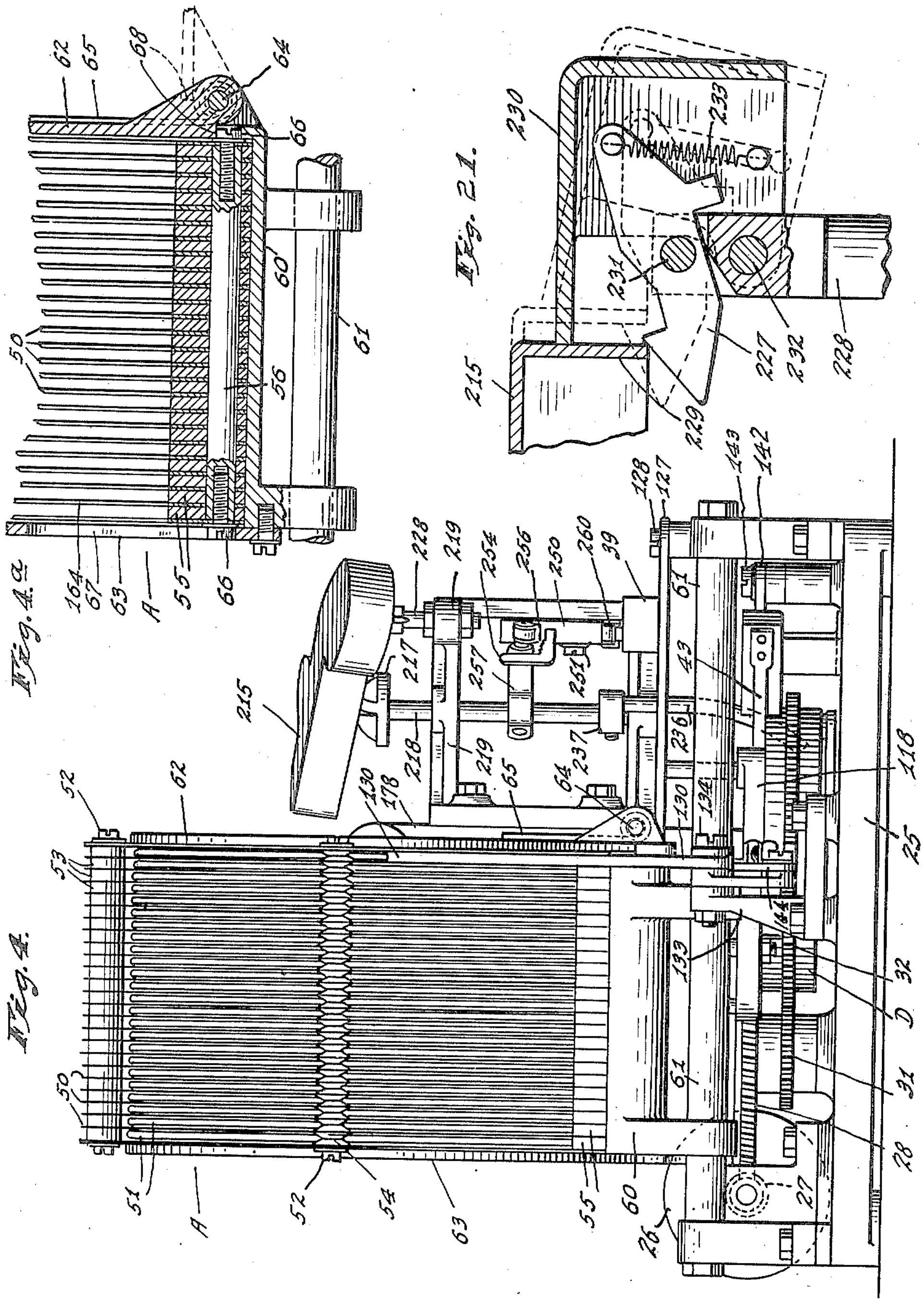
Figures 5, 6:
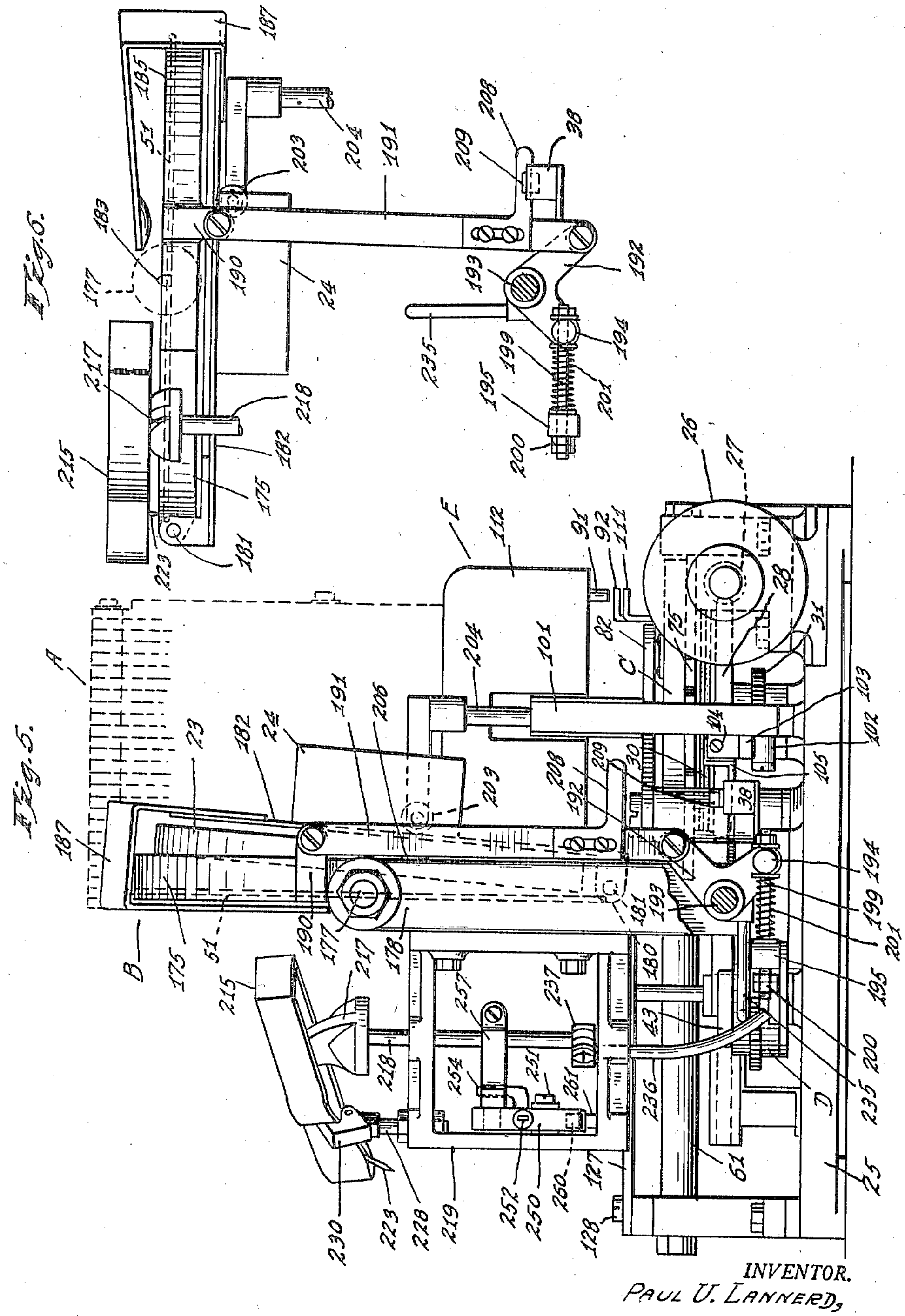
Figures 7, 8, 9, 10:
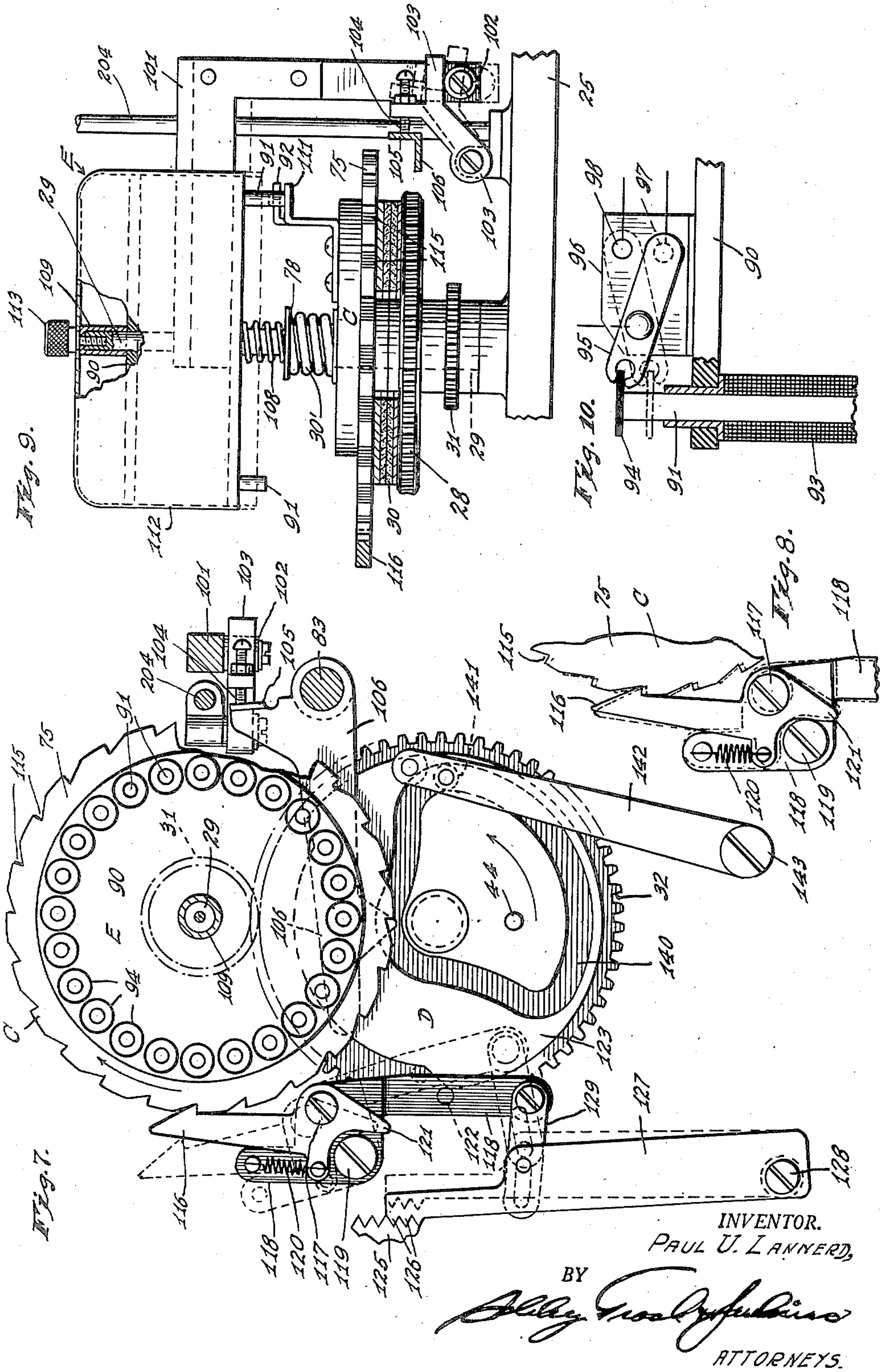
Figures 11, 12, 13:
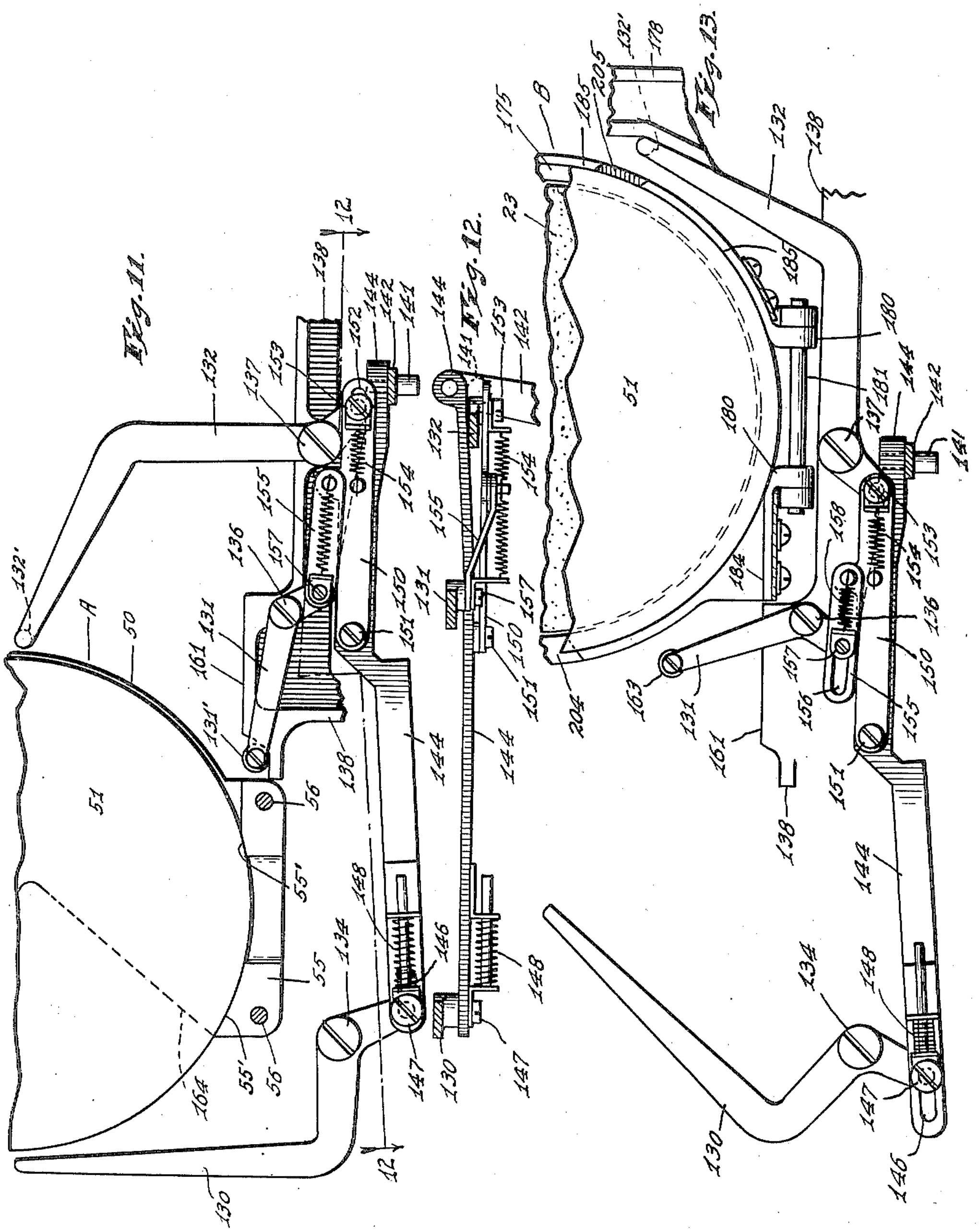
Figures 14, 16, 17:
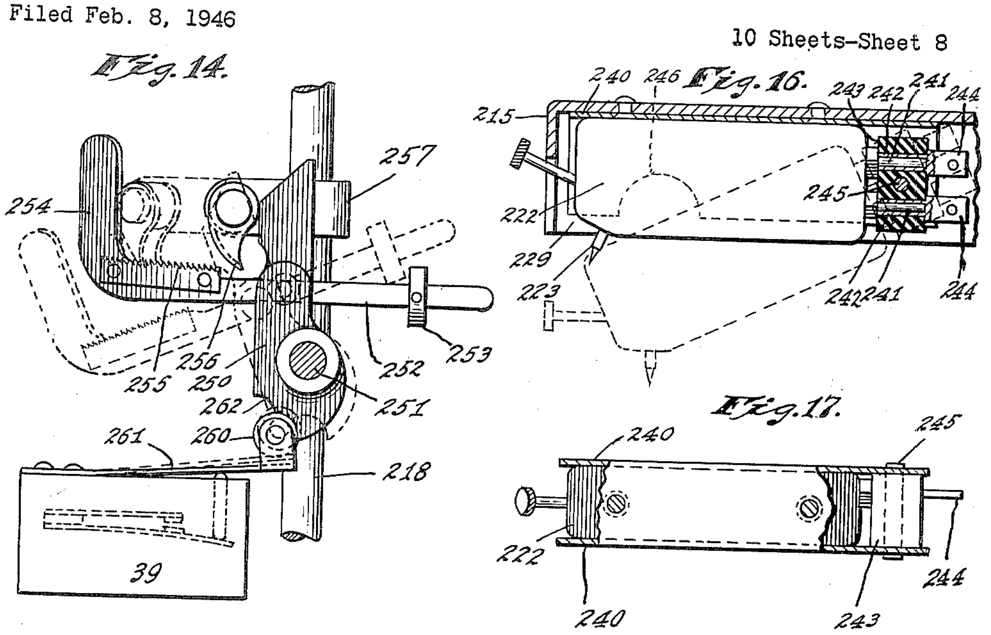
Figure 15:
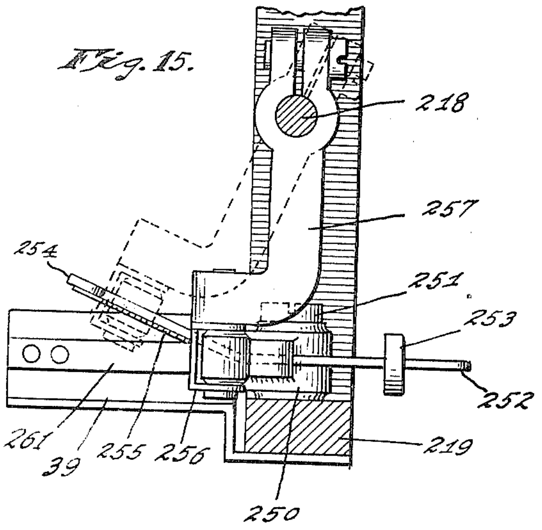
Figures 19, 20:
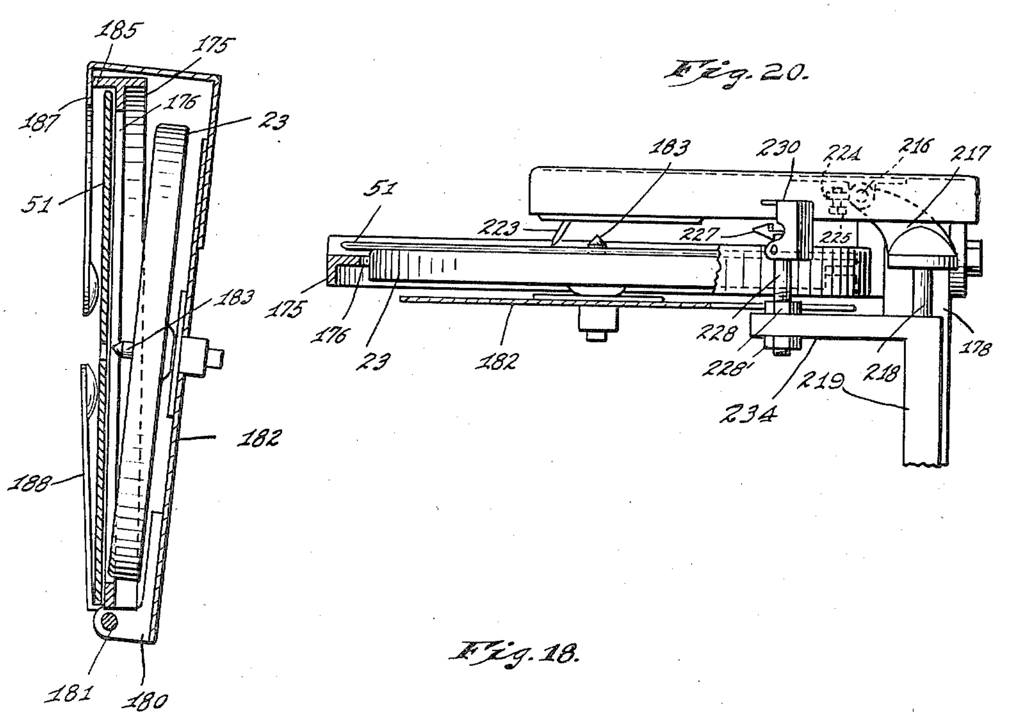
Figure 18:
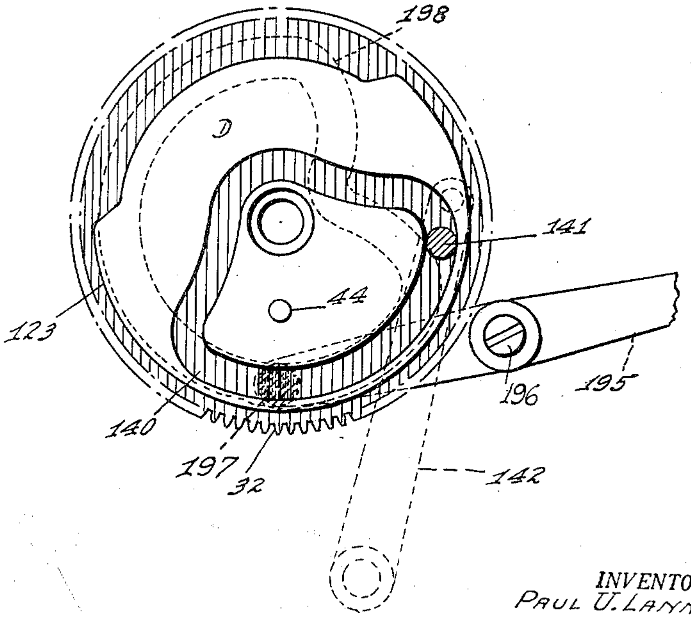
Figure 22:
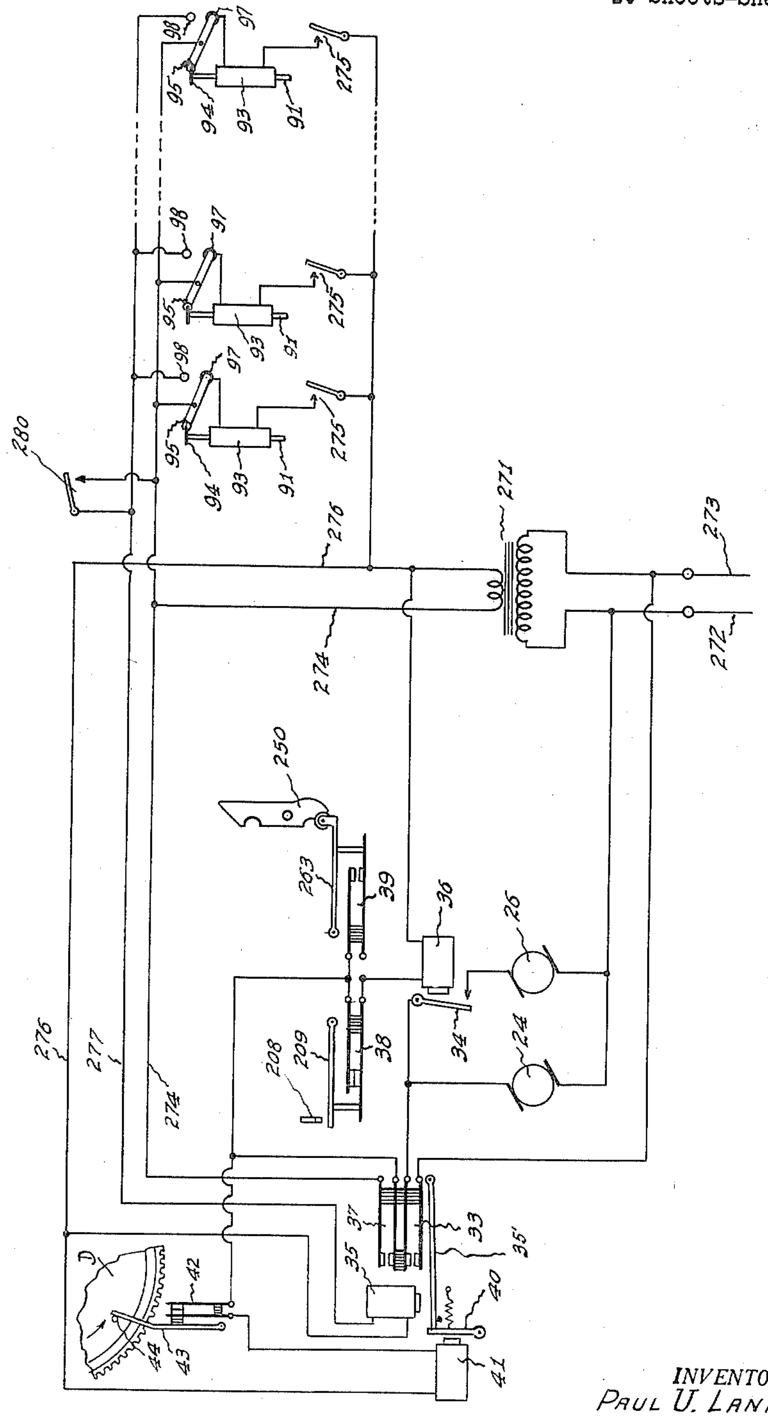

The accompanying drawing illustrates my invention: Fig. 1 is a plan view of the record changer in between-cycles condition with portions of the receiver broken away; Fig. 2 and 3 are front and rear elevations respectively; Fig. 4 is an end elevation taken from the left; Fig. 4a is a fragmental section on the line 4a—4a of Fig. 2; Fig. 5 is an end elevation taken from the right with portions of the frame structure broken away, showing the receiver in record-receiving position; Fig. 6 is a fragmental view similar to Fig. 5 showing the receiver in record-playing position; Fig. 7 is a fragmental plan view illustrating portions of the selector mechanism; Fig. 8 is a fragmental view similar to Fig. 7 showing the operation of the selector-cam latch; Fig. 9 is a fragmental elevation illustrating the means for driving the selector-cam and also showing details of the support for the selector solenoids; Fig. 10 is a fragmental detail view illustrating one form of solenoid-operated switch; Fig. 11 is a fragmental elevation of the record-transfer mechanism showing the parts in their normal positions; Fig. 12 is a horizontal section on the line 12—12 of Fig. 11; Fig. 13 is a view similar to Fig 11 showing the parts of the transfer mechanism in the positions they occupy on completion of the operation of transferring a record from the magazine to the receiver; Fig. 14 is an elevation and Fig. 15 a plan, both on an enlarged scale, showing details of the trip mechanism operative at the completion of a record-playing operation to initiate return of the record to the magazine; Fig. 16 is a vertical section on the line 16—16 of Fig. 1 showing on an enlarged scale details of the pick-up mounting; Fig. 17 is a plan view of the same structure, likewise on an enlarged scale; Fig. 18 is a plan view of the main cam on a somewhat enlarged scale; Fig. 19 is a vertical section through the receiver in record-receiving position; Fig. 20 is a fragmental front elevation showing the receiver in record-playing position; Fig. 21 is a fragmental elevation in partial section illustrating details of the device employed to control position of the pick-up arm; and Fig. 22 is a diagram illustrating electrical connections.

*General*

The records associated with the machine are carried in horizontally spaced, vertical compartments in a magazine, which is designated in its entirety by the reference letter A. The magazine A is slidably supported from a base 25, for reciprocation along a line normal to the planes of the records so that any of the records can be brought into position in line with a record receiver B which is tiltable between a generally vertical record-receiving position (Fig. 5) and a generally horizontal record-playing position (Figs. 6 and 20). The receiver B embodies a turntable 23 and a turntable-rotating motor 24.

Movement of the magazine A to bring any selected record into position opposite the receiver B is effected through a selector cam C supported for rotation about a vertical axis from the base 25 and adapted to be driven by a changer-motor 26 mounted on the base. Also driven from the motor 26 is a main cam D, which operates several different mechanisms, including one for transferring a selected record from and restoring it to the magazine and another for tilting the receiver B between its record-receiving and record-playing positions.

In the specific arrangement illustrated, the motor 26 drives a worm 27 meshing with a worm gear 28 which is rotatably mounted on a stationary shaft 29 projecting upwardly from the base 25. The cam C is also rotatably mounted on the shaft 29, and is operatively connected to the worm gear 28 through a friction clutch 30 loaded by a compression spring 30′ acting between the cam C and an abutment on the shaft 29. Control mechanism E, hereinafter described, operates to interrupt rotation of the cam C and stop the magazine A with a selected record opposite the receiver B. The main cam D is driven through the medium of a pinion 31 which is rigid with the worm gear 28 and meshes wth an annular series of teeth 32 on the cam D. The number of teeth on the pinion 31 is materially smaller than the number of teeth 32 on the cam D, in order that the pinion and the selector cam C driven by it may make at least one complete revolution during only a portion of a revolution of the main cam D.

The above-described drive arrangement, in which the worm gear 28 drives the selector cam C directly and the main cam D through the speed-reducing gearing 31—32, has an advantage in respect to simplicity of construction and efficiency of operation. The main cam D, which controls record-changing, must rotate at a speed which is only a fraction of the speed at which the motor 26 operates, while the speed of rotation of the selector cam C must be greater than that of the main cam in order to provide a full cycle of selector-cam movement during only a portion of a revolution of the main cam. By making the gearing between the cams C and D a part of the speed-reducing gear train between the motor 26 and the cam D, I am enabled to reduce gear-tooth loading and simplify construction.

The turntable motor 24 is controlled by a switch 33 (Fig. 22) which also, through a second switch 34 connected in series with it, controls the changer motor 26. The switches 33 and 34 are normally open. The switch 33 is adapted to be closed by an electromagnet 35 which is energized at the beginning of each cycle of changer operation. Closing of the switch 34 is effected by energization of an electromagnet 36 jointly controlled by three switches 37, 38, and 39. The switch 37 is a normally open switch, adapted to be closed with switch 33 upon energization of the electromagnet 35. The switches 38 and 39 are respectively normally closed and normally open, and are connected in parallel with each other and in series with the switch 37 and electromagnet 36. A latch 40, adapted to be released by energization of an electromagnet 41, functions by engagement with the armature 35′ of the electromagnet 35 to maintain the switches 33 and 37 closed when, as brought out hereinafter, the electromagnet 35 is deenergized during the course of the cycle. The latch-release magnet 41 is connected in series with the switch 37 and with a switch 42 adapted to be closed at the end of a cycle of record-changer operation and to be opened again shortly after the start of the next succeeding cycle. Conveniently, the switch 42 is controlled by a switch-operating arm 43 having a resilient end portion which projects into the path of a pin 44 carried by the cam D.

Upon initiation of a cycle of record-changer operation, the electromagnet 35 is energized to close the switches 33 and 37. The closing of the switch 33 completes a circuit through the turntable motor 24, which thereupon begins to rotate. The closing of the switch 37 completes two circuits, one through magnet 41 and switch 42 to move the latch 40 to released position and the other through magnet 36 and switch 38 to close switch 34 and initiate operation of the changer-motor 26. Driven by the motor 26 and controlled by the control means E, the selector cam C positions the magazine A with a selected record opposite the receiver B; and transfer mechanism controlled by the main cam D transfers the selected record to the receiver B. As the receiver reaches its horizontal position, the switch 38 is opened to de-energize relay 36 and stop the changer motor 26. With the receiver B horizontal, the record is played; and at the completion of the record the trip-switch 39 is closed to re-energize the relay 36 and thus start the changer motor 26, causing the receiver B to be tilted to its vertical position and the played record to be returned to the magazine.

The pin 44 on the cam D moves out of engagement with the switch-operating arm 43 soon after the start of the record-changer cycle which was initiated by energization of the magnet 35, and the resultant de-energization of the magnet 41 permits the latch 40 to maintain the switches 33 and 37 closed. Accordingly, de-energization of the magnet 35, which occurs later in the cycle as brought out more fully hereinafter, does not result in opening the switches 33 and 37, and the apparatus continues to operate throughout its cycle, or until the pin 44 engages the arm 43 to close the switch 42. Upon the closing of the switch 42, the magnet 41 is energized and the latch 40 is released to open the switches 33 and 37 and stop both of the motors 24 and 26.

*Record magazine*

In the broader aspects of my invention, the record magazine may have any desired construction, but I prefer to employ a magazine of the construction shown in Figs. 4 and 4*a*. As there shown, the magazine A comprises a plurality of partitions 50 spaced apart to provide compartments for the reception of records 51. At the top and outer side of the magazine, the partitions 50 are held together by bolts 52 extending through them and also through spacing collars 53 and 54. If desired, the spacing collars 54 at the outer side of the magazine may be provided with centrally located axial grooves to aid in locating the records 51 centrally in the compartments. At the bottom of the magazine, spacing plates 55 are disposed between the partitions 50; and two horizontally spaced rods 56 pass through such spacing plates and the partitions. Each of the spacing plates is provided centrally with a depression 55′ (Fig. 11) serving to locate the associated record in its own plane.

The magazine as just described is removable in its entirety, together with the records it contains, from association with a magazine carrier 60 slidably supported on two parallel guide rods 61 mounted on the base frame 25. The magazine is supported from the carrier 60 between vertical front and rear walls 62 and 63, the latter rigid with the carrier and the former pivotally mounted on the carrier by a horizontal pivot pin 64. A torsion spring 65, surrounding the pin 64, acts between the carrier 60 and the front wall 62 to bias the latter toward the vertical position illustrated in full lines in Fig. 4*a*.

The rods 56 are screw-threaded at the ends to receive clamp screws by which the partitions and spacing plates are held together, screws having heads 66 which overlie the end partitions 50, as will be clear from Fig. 4*a*. The rear wall 63 of the magazine carrier is provided with slots 67 which receive the heads 66 at the rear end of the magazine, while the front wall 62 of the carrier is provided with a shoulder 68 which, when the front wall 62 is in vertical position, overlies the bolt-heads 66 at the front end of the magazine and thus serves to hold the magazine in place on the carrier 60. When it is desired to change the magazine, the front wall 62 is swung from the full-line to the dotted-line position shown in Fig. 4*a* to permit the shoulder 68 to clear the bolt-heads 66 and thus to permit the magazine, together with the records it contains, to be removed as a unit.

By providing spare magazines which can be loaded with records at a central distributing point, the operation of providing a phonograph in the field with a new supply of records is greatly facilitated; for in changing the records in a phonograph it is not necessary to handle them individually but necessary only to remove the whole magazine and replace it with another containing a new supply of records.

*Selector mechanism*

Movement of the magazine A to bring any desired record it contains into position for transfer to the playing mechanism is effected by the cam C which, as brought out above, is frictionally driven from the worm gear 28. The cam C is provided (Fig. 1) with an upwardly opening, generally heart-shaped cam-groove 80 which receives a cam-following roller 81 mounted at an intermediate point on a lever 82 pivotally attached to the base 25 as by a screw 83. The free end of the lever 82 is connected by a link 84 with the magazine carrier 60 so that as the cam C rotates the magazine will be reciprocated.

To stop the selector cam 75 in any desired position preparatory to the transfer of a selected record from the magazine, I employ the control mechanism E, comprising a selector-head 90 which is slidably but non-rotatably carried on the stationary shaft 29 and upon which is mounted an annular series of vertically movable selector pins 91 corresponding in number to the number of record compartments in the magazine A. The selector pins 91 co-operate with an abutment 92 which is secured to the cam C for rotation therewith, each pin 91 being movable in the head 90 between an upper position in which it clears the abutment 92 as the latter rotates with the cam C and a lower position (shown at the right in Fig. 9) in which it projects into the path of the abutment 92 to be engaged thereby and thus interrupt rotation of the cam C.

For operating the pins 91, I prefer to employ in association with each such pin a solenoid 93 which, when energized, will move the pin from its upper to its lower position. At its upper end, in the construction shown, each pin 91 is provided with a head 94 of insulating material received in the notched end of a switch arm 95 which is pivoted intermediately on a bracket 96 projecting upwardly from the head 90. Associated with the opposite end of the switch arm 95 are a pair of fixed electrical contacts 97 and 98 mounted on the bracket 96 and adapted to be engaged by the switch arm when the pin 91 is in its upper and lower positions, respectively. Friction between the switch arm and the contacts 97 and 98 tends to hold the associated selector pin 91 in either its upper or lower position.

Rigid with the head 90 there is an L-shaped member 101 which projects downwardly beyond the periphery of the cam C and is provided at its lower end with a roller 102 disposed beneath the free end of an arm 103 pivotally supported on a horizontal axis from the base 25. The arm 103 carries an abutment 104, preferably adjustable, which engages one arm 105 of a bell-crank lever pivotally mounted on the base 25 conveniently through the same screw 83 upon which the magazine-shifting arm 82 is mounted. The other arm 106 of the bell crank overlies the cam D in position to be engaged and rocked by the pin 44 which projects upwardly from such cam.

In the rotation of the main cam D, the pin 44 engages the bell-crank arm 106 and swings it in a clockwise direction (Fig. 7) the depress the outer end of the arm 103 and cause the head 90 to move downwardly against the force exerted upon it by a spring 108 acting between it and an abutment on the shaft 29. As the pin 44 clears the arm 106, the spring 108 moves the head 90 upwardly, such upward movement of the head being limited by an abutment, conveniently a cup-like member 109, secured to the upper end of the shaft 29.

Immediately in advance of the abutment 92 in the direction of rotation of the cam C I provide a second abutment 111 vertically positioned to clear the end of a depressed selector pin 91. When, in the rotation of the selector cam C, the abutment 92 strikes a depressed selector pin 91 to interrupt rotation of the cam, the abutment 111 will be disposed immediately beneath such selector pin; so that when the head 90 is depressed in the manner above described the selector pin will engage the abutment 111 and will thus be raised relative to the head to its normal, upper position therein.

To protect the solenoids 93 and the switch mechanism 95—97—98, I employ a cup-shaped cover 112 which may be mounted on the upper end of the stationary shaft 29. Conveniently, a single screw 113 passing through central holes in the cover 110 and in the end of the member 109 serves to hold both the cover and such member in position.

In order to prevent friction between the abutment 92 and a pin 91 engaged thereby from holding the pin 91 depressed as the head 90 returns to its normal upper position after being lowered by movement of the arm 103, I provide means for rotating the cam C through a slight angle in a reverse direction to free the abutment 92 from engagement with the pin 91. To this end, the cam C is provided with an annular series of notches 115 each of which is adapted to receive a pawl 116. The notches 115 correspond in number to the selector pins 91 and are so located angularly with respect to the abutment 92 that when the cam C is stopped by engagement of the abutment with any selector pin 91, one of the notches will be in position to receive the pawl 116. The pawl 116 is pivotally secured by a screw 117 to a lever 118, and the lever 118 is in turn pivotally supported from the base 25 through a screw 119. A spring 120 acting between the pawl 116 and the lever 118 biases the pawl in a clockwise direction about the axis of the screw 117. Movement of the pawl under the influence of the spring 120 is limited by engagement of a shoulder 121 on the pawl and the head of the screw 119. The lever 118 is operated by the cam D through a cam-following pin 122 which is mounted on the lever in position to be engaged by a lobe 123 on the cam D. A torsion spring 124 (Fig. 3) acts on the lever 118 to hold the pin 122 against the cam-lobe 123.

Extreme positions of the lever 118 and of the pawl 116 are illustrated in full lines and in dotted lines in Fig. 7, the full-line position being that occupied by the parts after the pawl 116 has completed its reverse movement of the cam C to free a depressed pin 91 from contact with the abutment 92. The manner in which this reverse movement of the cam 75 is effected will be apparent from Figs. 7 and 8. When the pawl 116 is out of engagement with the cam C, the pawl and the lever 118 occupy the relative positions illustrated in dotted lines in Fig. 7 and in full lines in Fig. 8, the spring 120 holding the shoulder 121 against the head of the screw 119 and the pawl and lever swinging as a unit about the axis of such screw. After the cam-driving clutch 30 has made at least one complete revolution following initiation of a cycle of changer operation the cam-lobe 123 engages the pin 122 to swing the lever 118 from the dotted-line position toward the full-line position illustrated in Fig. 7, the pawl 116 swinging with the lever until its movement is interrupted by its engagement with the base of a notch 115 in the cam C. However, such engagement occurs before movement of the lever 118 by the cam-lobe 123 is completed, with the result that the lever 118 continues to swing in a clockwise direction and to draw the pawl 116 from the full-line position to the dotted-line position shown in Fig. 8, thus causing a slight rearward rotation of the cam C and freeing the abutment 92 from engagement with the pin 91.

Because of the possibility of wear and consequent lost motion between the heart-shaped cam groove 80 and the cam follower 81 and between the lever 82, link 84, and magazine-carrier 60, I prefer to embody in the record changer a means which will serve definitely to locate the magazine prior to the operation of the record-transfer mechanism. For this purpose, I mount on the side of the record carrier a bar 125 having a series of V-shaped notches adapted to co-operate with one or more complementary teeth 126 provided on the outer end of a lever 127 which is pivotally supported from the base 25 by a screw 128. The lever 127 is operatively connected with the lever 118 through the medium of a slotted link 129 which operates to move the lever 127 between the full-line and dotted-line positions shown in Fig. 7 when the lever 118 moves between its full-line and dotted-line positions shown in the same figure. As the lever 118 completes its movement in a clockwise direction, the lost motion provided by the slotted link 129 between it and the lever 127 is taken up and the teeth 126 are forced into engagement with the teeth on the bar 125, thus definitely locating the magazine.

The cam-lobe 123 remains in engagement with the cam-follower 122 to hold the magazine and the selector cam C locked against movement until after the selected record has been transferred, played, and returned to the magazine, and preferably throughout the entire remainder of the cycle of changer operation so that in the period intervening between successive cycles the condition illustrated in Fig. 1 will obtain and the selector mechanism will be locked against movement. In this condition, the follower 122 is at or near the trailing end of the cam lobe 123, so that immediately upon the inception of a new cycle the lobe 123 will move out of engagement with the follower 122 and permit the spring 124 to move the lever 118, pawl 116, and arm 118 to the dotted-line position of Fig. 7, thus releasing the selector cam and magazine.

The groove 80 in the selector cam C is shaped to move the magazine A in the following manner: Assuming the magazine A to be stopped with one of the records 51 near the center of the magazine opposite the receiver B, rotation of the selector cam through an angular increment equal to that between two adjacent selector pins 91 will move the magazine through a distance equal to twice the space between adjacent record compartments in the magazine and will thus bring opposite the receiver B the record two compartments removed from that initially opposite the receiver. The next increment of cam rotation will bring opposite the receiver B the record four compartments removed from that initially opposite the support. Considering the alternate records thus successively brought to discharge position as constituting one series and the remaining records as constituting a second series, successive increments of rotation of the cam C will bring the records of the first series successively to discharge position, as the magazine moves in one direction, until the last record of such first series is brought to discharge position. The next increment of selector-cam rotation will bring the adjacent end record of the second series to discharge position, and the magazine will then move in the reverse direction, bringing a record of such second series to discharge position each time the abutment 92 on the cam C reaches a position in which it would engage a depressed selector pin 91. Thus, although each record in the magazine passes through the discharge position twice in each complete revolution of the selector cam, it can be stopped at the discharge position in only one of its passages therethrough.

As a result of the arrangement just described the selecting operation is distributed throughout the entire cycle of movement of the magazine A and selector cam C instead of being concentrated in a portion only of such cycle as would be the case if stopping of the magazine to position a selected record could occur only with the magazine moving in one direction; for in that case it would be necessary to employ part of the selector cycle to return the magazine to the start of its selecting stroke. By distributing the selecting operation throughout the entire selector cycle and making it possible to stop the magazine while moving in either direction, I reduce accelerations and loads, thus reducing stresses and wear, increase the angular spacing between adjacent selector pins 91, obtain a more compact design, and in general simplify and improve construction.

I prefer that the number of teeth on the pinion 31 bear such a ratio to the number of teeth 32 on the main cam D that the selector cam C, if its rotation is not interrupted by a depressed selector pin 91, may make more than one complete revolution between successive engagements of the pawl 116. Most desirably, that ratio is such that if the electromagnet 35 is energized to institute a cycle without one or more of the selector pins 91 being depressed the cam C will rotate through one complete revolution and enough more to insure that the pawl 116 when next brought against the cam will engage in the notch 115 immediately adjacent the notch it engaged when the cycle was instituted. Thus, each time the apparatus is operated without a selector pin 91 being depressed the selector cam C will "over-run" a complete revolution by the angular distance between two adjacent notches 115, and the machine will play a record different from that previously played. The entire group of records in the magazine will be played in succession if the machine is operated continuously with no selector pin 91 being depressed. It is not necessary to the attainment of this result that the pawl 116 engage the notch next to that which it previously engaged in the event a cycle should be instituted with no selector pin depressed. If the number of teeth 32 on the main cam is not an integral multiple of the number of teeth on the pinion 31, the pawl 116 will engage a notch different from that it engaged during the immediately preceding cycle, and a different record will be played. However, in order that all records in the magazine may be played successively if the machine is operated continuously with no selector pin depressed it is necessary that the number of records in the magazine and the number of notches by which the cam C would over-run be prime to each other.

*Record transfer mechanism*

The record-transfer mechanism by means of which a selected record is moved from the magazine into association with the turntable and subsequently restored to position in the magazine after having been played is perhaps best illustrated in Figs. 2, 11, 12, and 13. It comprises a record-ejecting arm 130, a booster arm 131 provided with a rearwardly projecting, record-engaging roller 131′, and a record-return arm 132 provided with a rearwardly projecting, record-engaging pin 132′. The arm 130 is pivotally attached as by a screw 134 to a bracket 133 projecting upwardly from the base 25. The other arms 131 and 132 are pivotally attached, as by screws 136 and 137 respectively, to a second bracket 138 mounted on the base 25.

The levers 130, 131, and 132 are jointly operated by a cam groove 140 provided in the upper face of the cam D. The cam groove 140 receives a cam follower 141 carried by an arm 142 which is pivotally attached to the base 25, as by means of a pivot screw 143, and which has its outer end operatively connected to a link 144 through which all three of the arms 130, 131, and 132 are operated. The outer end of the link 144 is provided with a longitudinally extending slot 146 which receives a screw 147 carried by the lower end of the arm 130. A compression spring 148, acting between the link 144 and the screw 147, urges the latter toward the outer end of the slot 146. A secondary link 150, connected to an intermediate point of the link 144 as by a screw 151 has in its outer end a slot 152 which receives a screw 153, mounted in the lower end of the arm 132. A tension spring 154, acting between the link 150 and the screw 153 urges such screw toward the left-hand end of the slot 152. A tertiary link 155, pivotally connected to an intermediate point of the secondary link 150, is provided at its outer end with a slot 156 which receives a screw 157 on the lower end of the arm 131. A tension spring 158 acts between the link 155 and the screw 157 to urge the latter toward the right-hand end of the slot 156.

The parts of the transfer mechanism are illustrated in Fig. 11 in the positions they respectively occupy immediately prior to the operation of transferring a record fom the magazine A into the receiver B. In this condition, the free ends of the levers 130 and 132 are disposed on opposite sides of the magazine containing the records 51 and are spaced from such magazine so as not to interfere with its movement during the selection operation. The roller 131′ on the lever 131 lies below a record-supporting surface 161 provided on the bracket 138. The cam-groove 140, which operates the record-transfer mechanism, is so angularly related with the cam-lobe 123 that, promptly after engagement of the pawl 116 with the cam 75 and of the teeth 126 with the rack 125, the arm 142 and link 144 will be moved to the left. Since the springs 148 and 154 act to take up lost-motion between the link 144 and the arms 130 and 132, such arms will be swung in a clockwise direction, the arm 130 engaging the record 51 with which it is aligned and rolling such record toward the right out of the depression 55' in the spacer-plate 55. As the link 144 continues to move to the left, the arm 130 continues to move the record 51 out of the magazine and into the receiver B, the record rolling off the upper surface of the spacer plate 55 and over the roller 131' on to the record-supporting surface 161 of the bracket 138. During this movement of the link 144 and of the arms 130 and 132 the lost motion provided by the slot 156 between the link 155 and the arm 131 is being taken up; so that after the record rolls on to the surface 161 the arm 131 will be swung in a clockwise direction to cause the roller 131' on its outer end to engage the record and roll it along the surface 161 into the receiver B. The partitions 59 of the magazine are notched as indicated at 164 to prevent them from interfering with movement of the arm 130, such notches being deep enough to permit the arm 130 to roll the record on to the surface 161 to a point where the roller 131' can engage it. When the arm 130 reaches the limit of movement permitted by the notches 164, the link 144 continues to move to the left, compressing the spring 148. During the movements of the arms 130 and 131 just described the arm 132 is swung in a clockwise direction at a rate great enough to prevent the pin 132' from interfering with movement of the record.

The cam-groove 140 of the cam D holds the lever 142, the link 144, and the arms 130, 131, and 132 in the positions shown in Fig. 13 until after the receiver B is returned to vertical position following playing of the record. The cam-groove 140 then moves the free end of the lever 142 and the link 144 to the right to cause the pin 132' on the arm 132 to engage the record and return it to the magazine. In this operation, the arms 131 and 130 swing in a counterclockwise direction at a rate great enough to prevent interference with the returning record.

The use of the intermediate, or booster, arm 131 makes it unnecessary for the arm 130 to swing far enough to complete the placing of the record in the receiver B. By reducing the necessary swinging movement of the arm 130, I am enabled to reduce the depth of the notches 164 and thus increase the area over which the partitions 59 provide support for the records 51. The yielding connection provided by the spring 148 between the link 144 and the arm 130 makes it possible to insure that, in spite of any wear which may occur, the arm 130 will always move in a record-ejecting direction to the full extent permitted by the notches 164. The spring 154 and the lost-motion connection between the link 155 and the arm 131 insure that the roller 131' on such arm will not interfere with record movement by projecting above the surface 161 when the record passes over it. In the particular machine illustrated, the prime function of the spring and lost-motion connection between the arm 132 and the link 150 is to prevent engagement of the outer end of the arm with the standard 178 (hereinafter described) from interfering with or limiting movement of any of the links or other arms of the transfer mechanism. It will be noted from Fig. 13 that upon the completion of the transfer of a record to the receiver the arms 131 and 132 are in such positions that they will not interfere with swinging movement of the receiver, as hereinafter described.

*Record receiver*

The record receiver B comprises a record-support 175 having a central opening 176 large enough to receive the turntable 23 and provided at one side with a spindle 177 through which it is rotatably mounted on a horizontal axis in a standard 178 projecting upwardly from the base 25 near one end thereof. At that edge of the support 175 which is lowermost when the receiver is in its vertical position, the support is provided with two horizontally spaced, forwardly projecting ears 180 which receive a pivot pin 181 pivotally connecting the support 175 with a plate 182 disposed in rear of the support. The turntable 23 is rotatably supported from the plate 182 and is operatively connected in any suitable manner with the turntable motor 24, which is also supported from the plate 182. The turntable is provided with the usual pointed record-centering pin 183.

The support 175 is provided near its lower edge with a flange 184 (Fig. 13) which extends in a generally horizontal direction from a point adjacent the record-supporting surface 161 of the bracket 138 to the adjacent ear 180, the upper surface of such flange being substantially flush with the record-supporting surface 161 when the receiver B is in vertical position. A second flange 185 projecting forwardly from the support 175 extends from the other ear 180 substantially concentrically with the opening 176 to the top of the support and thence generally horizontally toward the magazine A to the edge of the support. The distance between the flange 184 and the horizontal portion of the flange 185 is slightly greater than the diameter of each record 51. As will be clear from Fig. 13, a record 51 rolled across the record-supporting surface 161 and the flange 184 by the arm 131 drops slightly as it passes over the first ear 180 and comes to rest against the arcuate portion of the flange 185, where it is slightly below a position of approximate concentricity with the turntable 173 and record-centering pin 183.

Near its upper edge, the plate 182 is provided with a record-retaining finger 187 which loosely embraces the upper edge of the support 175 and extends downwardly along the front thereof to a point adjacent the path of the end of the arm 132. Additional record-retaining fingers 188 and 189 may be secured to the support 175 adjacent the lower edge thereof. The record-retaining finger 187, by loosely embracing the upper edge of the support, limits relative swinging movement of the support 175 and plate 182 about the axis of the pivot pin 181. In the vertical position of the receiver B (Fig. 5) the weight of the motor 24, which is mounted on the rear face of the plate 182, tends to cause such plate to swing in a clockwise direction about the axis of the pivot pin 181. Such movement is limited, however, by engagement of the front portion of the record-retaining finger 187 with the edge of the flange 185 at the top of the support 175. In this position, the flange 185 holds the front portion of the finger 187 spaced from the face of the support 175 to permit a record to pass between the finger and the face of the plate, while the turntable and centering pin 183, by reason of the inclined position of the plate 182, are in rear of the record-plane and therefore do not interfere with entry of the record.

To swing the receiver B from the vertical record-receiving position of Fig. 5 to the horizontal record-playing position of Fig. 6, the support 175 is provided with a rearwardly projecting finger 190 connected by a link 191 with one arm of a bell crank 192 which is pivotally supported on a horizontal pivot pin 193 mounted in the lower portion of the standard 178. The other arm of the bell crank 192 is provided with an outwardly projecting pin 194 disposed opposite the outer end of a lever 195 which is pivotally supported on a vertical axis from the base 25, as by a screw 196 (Fig. 1). The other end of the lever 195 extends beneath the cam D and is provided with an upwardly projecting cam-follower 197 received in a cam groove 198 in the lower face of such cam. A rod 199 extending through the pin 194 and the lever 195 is provided beyond such pin and lever-end with abutments 200, conveniently nuts screw-threadedly mounted on the rod, which limit relative movement of the bell crank 192 and lever 195 under the influence of a compression spring 201 acting between the end of the lever 195 and the pin 194.

The cam groove 198, which controls swinging of the receiver B, is so shaped and disposed relative to the cam groove 140, which controls the record-transfer mechanism, that after delivery of a record 51 to the receiver B by the transfer mechanism the cam groove 198 will swing the lever 195 in a clockwise direction (Fig. 1) causing, its outer end to move to the left (Fig. 5), and rotate the bell crank 192 to lower the link 191 and cause the support 175 to swing toward the horizontal position illustrated in Fig. 6. During most of this movement, the free or upper edge of the plate 182 is supported from the support 175 by engagement of the finger 187 with the flange 185. As the support 175 nears horizontal position, however, the plate 182 engages a stationary stop, preferably in the form of a roller 203 supported from the upper end of a post 204 projecting upwardly from the base 25. Thereafter, as the support 175 continues to swing toward horizontal position about the axis of the spindle 177 it swings in a clockwise direction about the pivot pin 181 relative to the plate 182 and turntable 23, to leave the record resting on the turntable free from contact with the support 175 and therefore free to rotate with the turntable. It is to be noted that in the swinging movement which results in depositing it upon the turntable, the record swings about an axis approximately co-incident with its own horizontal diameter. Coincidence, or approximate coincidence, of such axis and a record-diameter, while preferred, is not essential; as it is sufficient for this phase of my invention only that the record swing about an axis which is spaced from the center of the record by a distance less than the radius of the record.

It was noted above that when a record was delivered to the receiver it dropped downwardly to rest on the ears 180 slightly below a position of concentricity with the turntable 23 and centering pin 183. In other words, the conventional pin-receiving hole in the center of the record is displaced slightly toward the ears 180 from the axis of the pin 183. This displacement, while insufficient to prevent the pointed end of the pin from entering the hole in the record, is sufficient to insure that as the pin enters the hole when the receiver B approaches horizontal position the record will move in its own plane into a concentric position and out of contact with the ears 180, which otherwise might interfere with record-rotation.

When the receiver B is to be restored to its receiving position preparatory to return of a played record to the magazine, the cam groove 198 in the cam D swings the lever 195 in a counterclockwise direction (Fig. 1) to move its outer end to the right (Figs. 5 and 6), and thus swing the support 175 toward its vertical position. During the initial stage of this movement, the plate 182, owing to the weight of the motor 24 and turntable 23, remains in contact with the roller 203 until the flange 185 engages the finger 187, and as the support 175 swings, its upper face engages the record anad separates it from the turntable. After the finger 187 has been engaged by the flange 185, the plate 182 and the parts it carries move as a unit with the support 175 until the vertical position illustrated in Fig. 5 is attained.

After the receiver B is restored to the vertical position the transfer mechanism operates as above described to return the played record to the magazine. During such operation, proper engagement between the record and the pin 132′ on the end of the transfer arm 132 should be maintained. For this purpose, such pin projects rearwardly through and beyond the plane of the record-engaging surface of the support 175, and such support is relieved, as indicated at 204 and 205 in Fig. 11, to provide clearance for the end of the pin.

It is essential that in the return movement of the receiver B the parts stop with the record coplanar with its compartment in the magazine A. To secure this result, I provide on the side of the standard 175 an abutment 206 which is positioned to engage the side of the link 191 and limit its movement and that of the support 175. Engagement of the link 191 with the abutment 206 occurs before the cam groove 198 has completed movement of the lever 195, and the latter therefore continues to move to compress the spring 201 and hold the link 191 firmly against the abutment 206, which is so located that the record will be in proper position to be restored to its compartment by the lever 132.

The exact position of the receiver B during the playing of the record is determined by the effective length of the rod 199 which interconnects the lever 195 and bell crank 192. The spring 201 takes up all lost motion in the mechanism interconnecting the plate 175 and the cam D, so that by adjusting one of the nuts 200 the effective length of the rod 199 may be varied. By this means it is possible to compensate for any manufacturing inaccuracies, or for wear, and to bring the table 23 into a horizontal position when a record is being played.

The switch 38, which as above described cooperates with the switches 34 and 39 to control the changer motor 26, is operated by the mechanism just described. To this end, the link 191 may be provided with a finger 208 which projects laterally from it in position to engage the operating arm 209 of the switch 38 and open such switch as the plate 175 reaches its horizontal position. Upon upward movement of the link 191 to restore the receiver B to its vertical position, the finger 208 moves out of engagement with the arm 209 and permits the switch 38 again to close.

*Pick up arm and control*

The pick-up arm 215 is shown in Figs. 2, 4, and 5, and in dotted lines in Fig. 21, in its between-cycles position. The pick-up arm is pivotally connected by a horizontal pivot pin 216 (Fig. 1) with a supporting member 217 rigidly mounted on the upper end of a vertical rock shaft 218 which is supported in a bracket 219 extending upwardly from the base 25. The pivot pin 216 is disposed generally transversely of the arm 215 so that the outer end of the arm may move vertically. Such outer end of the arm 215 carries a pick-up device 222 bearing the usual record-engaging needle 223.

The center of gravity of the pick-up arm is disposed to the left (Figs. 1 and 2) of the pivot pin 216, with the result that the outer end of the arm tends to drop downwardly under the influence of gravity. To limit such movement, the member 217 is provided with a laterally projecting finger 224 carrying an abutment 225 upon which the arm rests when not supported by a record being played. In this position of the arm, its outer end is somewhat lower than it is when a record is being played, so that in the movement of the receiver B to record-playing position the needle 223 will be engaged by the record to lift the arm into the substantially horizontal position indicated in Fig. 20. In this position, the arm is well above the abutment 225 so that it will be free to bear upon and follow the record being played.

In the condition existing between cycles of the record changer, the arm 215 is held against movement about the axis of the shaft 218 by a latch 227 (Fig. 21) which is pivotally mounted on a horizontal axis in the upper end of a rod 228 projecting upwardly from the bracket 219, such latch engaging the adjacent lower edge of a peripheral flange 229 on the pick-up arm. Also pivotally mounted on the rod 228 is a member 230 which is adapted to engage the outer face of the flange 229 and urge the pick-up arm 215 toward the center of a record to be played. Conveniently, the latch 227 is pivotally connected to the rod 228 by a pivot pin 231 disposed above a pivot pin 232 by which the member 230 is connected to the rod 228, and a single tension spring 233 acting between the latch and the member biases the latch toward engaged position and the member 230 for swinging movement in a counter-clockwise direction.

In the between-cycles position of the pick-up arm, which is illustrated in dotted lines in Fig. 21, the member 230 is urging the pick-up arm 215 toward the left and the pick-up arm is engaged by the latch 227 to resist such urging. As the receiver B reaches the playing position illustrated in Figs. 6 and 20, the needle 223 on the pick-up arm is engaged by the peripheral portion of the record and the flange 229 on the pick-up arm is lifted clear of the latch 227. The arm is now free to move inwardly of the record, or toward the left in Fig. 21, under the influence of the pressure exerted on it by the member 230, and the arm therefore moves inwardly of the record until the needle enters the sound track thereon.

Preferably, the lower portion of the rod 228 is screw-threaded and provided with two nuts 228' (Fig. 2) disposed on opposite sides of an arm 234 which projects horizontally from the bracket 219. This arrangement provides for common vertical adjustment of the latch 227 and member 230.

After the record is played, the pick-up arm is restored to its between-cycles position through the co-operation of two fingers 235 and 236, the former rigid with and projecting generally radially from the bell crank 192 and the latter projecting downwardly from the end of an arm 237 rigidly secured to the rock shaft 218. The co-operating fingers 235 and 236 are so shaped that as the bell crank 192 rocks to move the record support B from the position shown in Fig. 6 to the position shown in Fig. 5 after the record has been played, the finger 235 will engage the finger 236 and force it forwardly to cause the pick-up arm to swing in a counter-clockwise direction (Fig. 1). Obviously, in order to prevent scratching of the record, the interengaging fingers 235 and 236 should be so shaped as not to institute return movement of the pick-up arm until after the receiver B has been tilted far enough to free the record from engagement with the needle 223.

During return movement of the pick-up arm, as at all other times when it is not supported by a record, the arm rests under the influence of gravity upon the abutment 225 at a height such that its peripheral flange 229 will engage the latch 227, as shown in full lines in Fig. 21. The final increment of return movement of the arm 215 causes the flange 229 to depress and be engaged by the latch 227 and the member 230 to be tilted against the force exerted on it by the spring 233, all as shown by dotted lines in Fig. 21.

Adjacent the outer end of the arm 215 there is secured against its lower surface a sheet-metal clip 240 (Figs. 16 and 17) having downwardly projecting, generally parallel flanges between which the pick-up device 222 is received. The clip 240 is so formed that its opposed flanges resiliently grip the pick-up device 222 between them. The pick-up device 222, which otherwise may be of any desired construction, is provided with two parallel prongs or fingers 241 extending rearwardly for reception in and electrical contact with two metal sleeves 242 secured in a block of insulating material 243 and provided with ears 244 adapted to be connected to electrical conductors extending to the circuit of the amplifier (not shown). The block 243 is pivotally supported from the arm 215 on a horizontal axis, as through the medium of a pivot pin 245 which extends through the block and the opposite walls of the clip 240.

The normal position of the pick-up device 222 is illustrated in full lines in Fig. 16. To remove the pick-up device, it is grasped from below and swung, together with the block 243, about the axis of the pin 245 to the dotted-line position illustrated in Fig. 16 and is then moved to the left to withdraw the prongs 241 from the sleeves 242. Conveniently, the flanges of the clip 240 are relieved as indicated at 246 in Fig. 16, to facilitate removal of the pick-up device from the clip.

As a result of this arrangement for mounting the pick-up device 222, it is held firmly in operative position by the clip 240, and in such position is concealed and protected by the peripheral flange 229 on the arm 215. At the same time, the device can readily be removed from the arm for purposes of inspection, repair, or replacement.

*Trip switch*

It will be recalled that as the receiver B reaches its horizontal or record-playing position the finger 208 on the link 191 engaged the switch-operating arm 209 to open the switch 38 and stop the changer motor 26. It is accordingly necessary to provide means for restarting the motor 26 after a record has been played. For this purpose, I employ the switch 39 previously mentioned and the switch-operating mechanism illustrated in Figs. 14 and 15. Such switch-operating mechanism comprises a generally vertical actuator 250 mounted for swinging movement about a horizontal axis, as through the medium of a screw 251 received in the bracket 219. The actuator 250 is provided with a bar 252 which extends through and projects horizontally beyond both sides of the actuator and which is provided at one end with an adjustable counter-weight 253 and at the other end with an upwardly projecting finger 254. Between the finger 254 and the actuator 250, the bar 252 carries a series of ratchet teeth 255 adapted to co-operate with a pawl 256 depending for free swinging movement about a horizontal axis from the outer end of an arm 257 rigidly secured to the rock shaft 218.

At its lower end the actuator 250 engages a roller 260 mounted on the free end of a switch-operating arm 261 associated with the trip switch 39. Such switch is biased toward closed position; but when the actuator 250 is in its normal position, illustrated in full lines in Fig. 14, the lower end of such actuator engages the roller 260 to hold the switch-operating arm 261 depressed and the switch 39 open. The roller-engaging surface of the actuator 250 is provided with a relief 262 which, upon counter-clockwise tipping of the actuator from its normal position, permits the roller 260 and switch-operating arm 261 to rise and the switch 39 to close. The counter-weight 253 is adjusted so that the actuator 250, when in its normal position, is lightly biased by gravity in a clockwise direction, its movement in such direction being limited by engagement of the roller 260 with an abutment 263 on the lower end of the actuator.

The manner in which the trip-switch operating mechanism functions to cause closing of the switch 39 depends upon whether the sound-track of the record being played is one in which the needle-receiving groove terminates in a simple spiral or in an eccentric portion. As the arm 257 and the pick-up arm 215 are both rigid with the shaft 218, the arm 257 will follow movements of the pick-up arm. If the sound-track of the record being played terminates in a simple spiral, the free end of the arm 257 will engage the finger 254 at the conclusion of record-playing and will tilt the actuator 250 into the dotted-line position shown in Fig. 14, in which the roller 260 will be received in the relief 262 to permit the switch 39 to close. If, on the other hand, the groove in the record terminates in an eccentric portion, the pawl 256, co-operating with the teeth 255, will eventually tip the actuator 250 into the dotted-line position shown in Fig. 14 to cause closing of the switch 39.

The actuator 250 and the parts it bears are so proportioned that their common center of gravity is above the axis of the screw 251. The counter-weight 253 is so adjusted that only a slight movement of the actuator in a counter-clockwise direction is necessary before the force of gravity becomes effective to promote further counter-clockwise movement. As a result, only a slight effort need be exerted by the arm 257 on the finger 254 or by the pawl 256 on the teeth 255 to cause the actuator 250 to swing from the full-line to the dotted-line position of Fig. 14. As the effort required to tilt the actuator 250 is reflected by a lateral pressure of the needle 223 on the sides of the sound-track of the record, and as such pressure causes wear of the sound-track, it will be obvious that by reducing the effort required to close the trip switch 29 I have effected a material reduction in the rate of record wear.

*Selector control*

The solenoids 93, by the energization of which the pins 91 are selectively projected into the path of the abutment 92 on the cam C, may be controlled in any desired manner. In the arrangement shown in Fig. 22, the solenoids 93, together with the electromagnets 35, 36, and 41, are adapted for energization by low-voltage current derived from a step-down transformer 271, the primary of which is connected across supply mains 272 and 273. A low voltage supply wire 274 extending from one terminal of the secondary of the transformer 271 is connected in common to all the switch-blades 95 respectively associated with the several selector-solenoids 93. The fixed contact 97, with which each switch blade 95 is normally in contact, is connected to one terminal of the associated solenoid; while the other terminal of such solenoid is connected, through a selector switch 275, with a conductor 276 extending to the opposite terminal of the secondary of transformer 271. As a result, when any selector switch 275 is closed, a circuit is completed between the low voltage supply wires 276 and 274 through the closed switch 275, the winding of the associated solenoid 93, and the elements 97 and 95 of the associated switch. The resultant energization of the solenoid 93 causes its associated pin 91 to be moved into the path of the abutment 92 on the selector cam C and, in such movement, to separate the switch blade 95 from the contact 97, thus opening the solenoid circuit.

Conveniently, energization of any solenoid 93 and consequent movement of its associated pin 91 are utilized to effect energization of the electromagnet 35 and institution of a cycle of phonograph operation. To this end, one terminal of the magnet 35 is connected to the low-voltage supply wire 276, while the other terminal is connected in common, through a conductor 277, with all the fixed contacts 98 associated with the several selector solenoids 93. Upon energization of any such solenoid and consequent depression of its pin 91, the associated switch blade 95 and contact 98 interengage to complete a circuit from supply wire 274, through switch elements 95 and 98 and the electromagnet 35, to the wire 276.

Other connections which may here be described or reviewed include the following: The switches 38 and 39 are connected in parallel with each other and in series with the switch 37 and electromagnet 36 between the low-voltage supply wires 274 and 276. The winding of latch-release magnet 41 is connected across the wires 274 and 276 in series with the switches 37 and 42.

*Operation*

Fig. 22 illustrates the condition existing when the phonograph is not in operation. The selector switches 275 are all open, the solenoids 93 are all de-energized, the solenoid-operated pins are all in their upper positions, and the switch blades 95 are all in engagement with the respective fixed contacts 97. The switch 42, operated by the cam D, is closed, but the switch 37 in series with it is open, and the latch-release magnet 41 is consequently de-energized. The trip switch 39 is open and the switch 38 in parallel with it is closed; but as these switches are also in series with the open switch 37, the magnet 36 is de-energized and the switch 34 is open. The switch 33, which controls the supply of current to the motors 24 and 26 is likewise open.

The record-transfer arms 130 and 132 occupy positions at the sides of the magazine A as shown in Figs. 2 and 11, and the magazine is therefore free to move along the guide rods 61. The receiver B is in its vertical, record-receiving position, while the pick-up arm 215 is in the position shown in Fig. 2 and in dotted lines in Fig. 21, engaged by the latch 227.

Operation of the apparatus is instituted by momentary closing of any of the selector switches 275. When such a switch is closed, the associated solenoid 93 is energized to depress its pin 91 into the path of movement of the abutment 92 on the cam C. At the same time, separation of the switch elements 95 and 97 de-energizes the solenoid, while inter-enegagement of the switch blade 95 and contact 98 completes a circuit through the electromagnet 35. As nothing urges a depressed pin 91 upwardly, it remains depressed, and the circuit through the electromagnet 35 remains closed, until later in the cycle. Energization of the magnet 35 closes the switches 33 and 37, the closing of switch 33 completing a circuit to the turntable motor 24. Closing of the switch 37 completes two circuits, one from the supply wire 274 through the switch 38 and electromagnet 36 to the supply wire 276 and the other from supply wire 274 through the switch 42 and electromagnet 41 to the supply wire 276. By virtue of the closing of the first mentioned circuit, the switch 34, in series with the changer motor 26, is closed, so that the changer motor begins to operate. Completion of the second circuit energizes the magnet 41 and moves the latch 40 to released position; but such action is not significant, as the magnet 35 is still energized and acting to hold the switches 33 and 37 closed. As the changer motor 26 begins to operate, the cam D starts to rotate, moving the pin 44 out of engagement with the switch-operating arm 43 to permit opening of the switch 42 and de-energization of the latch-release magnet 41. When this occurs, the latch 40 drops into latching engagement with the armature 35′ so that the switches 33 and 37 will remain closed when the magnet 35 is subsequently de-energized.

As the cam D begins to rotate following closing of the switches 33 and 34, the lobe 123 passes out of engagement with the cam follower 122 on the arm 118, thus permitting such arm to move from the full-line to the dotted-line position of Fig. 7 under the influence of the spring 124. In this movement of the arm 118, the latch 116 is carried out of engagement with the notch 115 in the selector cam C, and that cam begins to rotate under the torque transmitted to it through the friction clutch 30. As the selector cam C rotates, its cam groove 80 operates through the lever 82 and link 84 as above described to move the magazine A along the guide rods 61, such rotation of the cam C and movement of the magazine A continuing until the abutment 92 on the cam C engages the depressed selector pin 91 to prevent the cam C from rotating further. When rotation of the cam C is thus interrupted, the magazine A comes to rest with the record 51 corresponding to the closed selector switch 275 opposite the receiver B.

During the selecting operation just described, the cam follower 141 on the lever 142, which operates the record-transfer mechanism, occupies a dwell in the cam groove 140 of main cam D. Such dwell is long enough to prevent any movement of the record-transfer arms 130 and 132 until after the lobe 123 on the cam D has moved the lever 118 to cause the pawl 116 to engage a notch 115 and retract the cam C slightly to free the depressed selector pin 91 from frictional engagement with the abutment 92. After engagement of the pawl 116, and simultaneous engagement of the teeth 126 on the arm 127 with the rack 125 to lock the magazine in fixed position, the cam groove 140 in the main cam D causes the arm 142 to swing to the left (Fig. 7) to operate the record-transfer arms 130, 131, and 132 to transfer the selected record from the magazine to the receiver B.

After the selected record has been placed in the receiver, the lever 195 is actuated by the cam groove 198 in the lower face of the cam D to rotate the receiver on its horizontal axis into its horizontal, record-playing position shown in Fig. 6. As above described and as shown in Fig. 20, the record 51 in the receiver lifts the pick-up arm 215 clear of the latch 227. As the receiver reaches horizontal position, the pick-up arm 215 is urged inwardly of the record by the member 230 to cause the needle 223 to enter the sound-track. Since the turntable motor 24 began to operate upon closing of the switch 33 when the cycle was instituted, the record begins to rotate as soon as the support 175 moves clear of it in the final stage of the movement of the receiver B to the horizontal position illustrated in Figs. 6 and 20. As previously brought out, the finger 208 on the link 191, engages the operating arm 209 of the switch 38 as the receiver B reaches its record-playing position; and, as a result, the electromagnet 36 is de-energized to open the switch 34 and stop the changer motor 26. This condition obtains as long as the record is being played.

Upon conclusion of the playing of the record, the trip-switch 39 is closed, as above described, to energize the electromagnet 36, close the switch 34, and restart the changer motor 26. As the cam D resumes rotation following restarting of the motor 26, the arm 195 is moved by the cam groove 198 in the lower face of the main cam D to restore the receiver B to the vertical position shown in Fig. 5, and also to restore the pick-up arm to its between-cycles position. Early in this operation, and before the arm 257 on the rock shaft 218 has engaged the actuator 250 to open the switch 39, the finger 208 moves upwardly out of engagement with the switch-operating arm 209 and permits the switch 38 to close, so that when the switch 39 is opened upon return of the pick-up arm 215 to its between-cycles position, the magnet 36 will remain energized and the switch 34 closed to continue the changer motor 26 in operation.

After the receiver B has reached its vertical position, the arm 142 is operated by the cam groove 140 to cause the record-transfer lever 132 to restore the played record to its compartment in the magazine as above described.

At some time before the end of the cycle, but after the pawl 116 has engaged a notch 115 to free the abutment 92 from engagement with the depressed selector pin 91, the pin 44 on the main cam D engages the bell crank 106 to lower the selector head 90 and cause such selector pin to be retracted. Retraction of the depressed selector pin 91 moves the associated switch-blade 95 out of engagement with the contact 98 and into engagement with the contact 97. Separation of the switch elements 95 and 97 de-energizes the magnet 35; but as the latch 40 is in position to hold the switches 33 and 37 closed, operation of the changer continues. The operation of retracting a depressed selector pin may occur either before or after the playing of the record, but preferably occurs before the record is played and while it is being transferred from the magazine to the receiver. Retraction of a depressed selector pin does not free the selector cam for rotation under the influence of the torque imposed upon it through the friction clutch 30, because the pawl 116 is engaged with the cam at the time of pin-retraction and remains engaged throughout the remainder of the cycle.

Following restoration of the played record to its compartment in the magazine A, the pin 44 engages the switch-operating arm 43 and causes it to close the switch 42. When this occurs, a circuit is completed from the low-voltage supply wire 274 through the switches 37 and 42 and the magnet 41 to the supply wire 276. The resultant energization of the magnet 41 releases the latch 40 and permits the switches 33 and 37 to open, thus restoring the conditions which existed before the selector switch 275 was closed to initiate the cycle.

In the arrangement shown, it is possible to energize a plurality of solenoids 93 simultaneously, by simultaneously closing the respectively associated selector switches 275, or to energize one or more solenoids simultaneously or successively during a cycle. The switches constituted by the several blades 95 and contacts 98 are all connected in parallel with each other and in series with the control magnet 35, with the result that such magnet remains energized to maintain the switches 33 and 37 closed, as long as any selector pin 91 remains depressed. Therefore, although the switch 42 will be closed at the end of a cycle to release the latch 40, the apparatus will continue to operate to play selected records in succession until the conclusion of the cycle in which the last depressed selector pin is retracted.

For the purpose of operating the machine to play records successively without selection, the machine may be provided with a manually operated switch 280 connected in parallel with the switches 95-98 across the conductors 274 and 277. By closing the switch 280, the control magnet 35 may be maintained energized to cause cycles of operation to follow each other. When the apparatus is operated in this manner, rotation of the selector cam C is interrupted during each cycle by engagement of the pawl 116 with a notch 115 on the cam; and, because of the over-run of the selector cam, the cam will be stopped in a different position, and a different record will be played, for each cycle during which the switch 280 remains closed. It is to be noted, however, that in the absence of the switch 280, operation of the apparatus can be instituted or continued only by the depression of selector pins, which will control selection of the records played.

I claim as my invention:

1. In an automatic phonograph, a record receiver swingable about a generally horizontal axis toward and away from a record-receiving position; said receiver comprising a record support, a turntable support, and a turntable rotatably mounted on said turntable support, said turntable support and record support being relatively movable to transfer a record from the record support to the turntable, the axis of said turntable lying in a plane perpendicular to the horizontal axis about which the record receiver is swingable; means for swinging said receiver about its axis, said two supports moving as a unit during a portion of the swinging movement of said receiver; and means operative during another portion of the swinging movement of said receiver for causing relative, record-transferring movement of said two supports.

2. The invention set forth in claim 1 with the addition that said two supports are pivotally interconnected for relative swinging movement about an axis substantially parallel to but spaced from the receiver axis.

3. The invention set forth in claim 1, with the addition that in the record-receiving position of said receiver said record support is substantially vertical.

4. The invention set forth in claim 1 with the addition that said turntable support is biased in a direction away from said record support, said last named means comprising an abutment positioned to engage and limit movement of said turntable support as said receiver nears the limit of its movement in a direction away from its record-receiving position.

5. In an automatic phonograph, a horizontally movable magazine adapted to support a plurality of records in vertical positions, a record receiver disposed at one side of said magazine, said receiver comprising a record support and a turntable support, a turntable rotatably mounted on said turntable support, said record support having a record-engaging surface, said two supports being relatively movable to permit said turntable to pass through the plane of said supporting surface, means limiting movement of said turntable support between positions in which said turntable lies on opposite sides of such plane, means supporting said receiver for swinging about a horizontal axis between a receiving position in which said record support is generally vertical and said turntable is behind said record-engaging surface and a playing position in which said turntable is horizontal and above the record-engaging surface of said record support, means for moving said magazine to position a selected record opposite said receiver when the latter is in vertical position, means for transferring such record from the magazine to the receiver and for returning it to the magazine, and means for swinging said receiver between its receiving and playing positions.

6. In an automatic phonograph, a record support having a forwardly presented record-engaging surface and mounted for swinging movement to and from a substantially vertical position about a horizontal axis disposed generally diametrically of said record-engaging surface, a turntable support, a turntable and turntable driving motor mounted on said turntable support, said record support being provided with an opening through which said turntable is adapted to pass, means pivotally interconnecting said record support and turntable support for relative movement about a horizontal axis disposed below said opening when the record support is in vertical position, said turntable support extending upwardly behind said record support to support said turntable in position to move through said opening as the two supports move relatively to each other about their axis of pivotal interconnection, a record-retaining finger secured to said turntable support near the free edge thereof, said finger extending forwardly and downwardly in spaced relation to the record-engaging surface thereof in position to permit relative swinging movement of said two supports, the center of gravity of the turntable support and elements mounted thereon being in rear of the axis of interconnection of said supports whereby gravity will tend to maintain the downwardly extending portion of said finger in engagement with said record support, means for swinging said support about its axis of mounting between a vertical position and a generally horizontal position in which said turntable support will be beneath it, and a stop positioned to engage said turntable support as said record support nears such horizontal position whereby, as said record support continues to move toward horizontal position, a record on said record support will be transferred to the turntable.

7. In a multi-record phonograph, a record magazine, record transfer mechanism operable to remove a record from said magazine, means including a rotatable element rotatable in one direction to produce relative movement of said transfer mechanism and magazine, an abutment on said rotatable element, an annular series of stops selectively projectable in a direction generally parallel to the axis of said rotatable element from a normal position into the path of said abutment whereby to interrupt operation of said means with a selected record in association with said transfer mechanism, a head providing a common mounting for said stops, means for reciprocating said head axially of said rotatable element, and a second abutment carried by said rotatable element in advance of said first abutment in position to engage a pin in association with said first abutment and force such pin into its normal position in the head as the latter reciprocates.

8. The invention set forth in claim 7 with the addition of means operable in timed relation with said head-reciprocating means for moving said first abutment out of engagement with a projected pin prior to reciprocation of said head.

9. In a multi-record phonograph, record selecting mechanism including an abutment and a support for a plurality of selector pins, said support and abutment being relatively movable, said pins being selectively movable between retracted positions in which they lie out of the path of relative abutment-movement and advanced positions in which they project into the path of relative abutment movement, means for reciprocating said pin-support normally to said path of relative abutment-movement, and a second abutment positioned with respect to said first abutment to engage and return to retracted position in said support as said support reciprocates a projected pin in association with said first abutment.

10. In an automatic, multi-record phonograph, record-selecting mechanism including a rotatable member, means for applying a unidirectional driving torque to said member, an abutment on said member, circumferentially spaced stops selectively projectable into the path of said abutment to interrupt rotation of the member, said member being provided with a circumferential series of notches, a lever pivotally mounted on an axis parallel to the axis of the rotatable member, a pawl pivotally mounted on said lever and engageable with any of said notches to prevent rotation of said member under the influence of the torque applied thereto, means biasing said pawl for movement about its axis of pivotal mounting on said lever toward engagement with said rotatable member, provisions for limiting such movement of the pawl, and means acting on said lever for swinging it to and beyond a position in which said pawl engages in one of said notches, the axis of pivotal mounting of said pawl on said lever being located adjacent a straight line joining the respective axes of the rotatable member and the lever whereby the pawl's motion as said lever swings beyond the position of pawl engagement will have a component tangential of said rotatable member to cause the latter to be rotated against such driving torque to move said abutment out of contact with any stop which, by engaging the abutment, interrupted rotation of the rotatable member.

11. In an automatic, multi-record phonograph, a record magazine, record-playing mechanism, transfer mechanism for moving a record from the magazine to the playing mechanism and returning it to the magazine, selector means for moving said magazine and transfer mechanism relatively, said means including a rotatable member, a latch engageable with said rotatable member for stopping it at any of a plurality of stations, driving means for operating said selector means, transfer mechanism, and latch in timed relation, selector control means including a series of selectively operable stops for stopping said rotatable member at any of said stations, and an operative connection for rotating said rotatable member through a predetermined angle in excess of one complete revolution between successive engagements of said latch when none of said stops is positioned to stop it whereby if no stop is positioned to interrupt rotation of the rotatable member such member will occupy at each engagement of the latch a position different from the position occupied at the preceding engagement of the latch.

12. In a multi-record phonograph, a magazine having a series of spaced record-compartments, record-playing mechanism, transfer mechanism for transferring a selected record between the magazine and playing mechanism, a rotatable main cam operative at each revolution to cause operation of said transfer mechanism, mechanism operable jointly with said main cam during a portion only of each revolution of such cam for reciprocating said magazine to cause records in said magazine to pass said transfer mechanism in succession, said last named mechanism including a member movable in one direction only, and means engageable with said member while said magazine is moving in either direction for stopping said magazine with a selected record opposite said transfer mechanism, said means being operative when said magazine is moving in one direction to stop the magazine with any of alternate record-compartments opposite said transfer mechanism and operative when the magazine is moving in the opposite direction to stop the magazine with any of the remaining record compartments opposite said transfer mechanism.

13. In an automatic phonograph, supporting means for supporting a record in substantially vertical position, a record receiver, a member extending between said supporting means and said receiver and having a record-supporting surface, and means for transferring a record between said supporting means and said receiver, said means comprising two arms pivotally mounted on horizontally spaced axes, one of said arms being swingable about its axis to roll a record in said supporting means therefrom and on to said record-supporting surface and the other arm being swingable about its axis to roll the record over said surface into said receiver, and means for operating said arms in timed relation, said arm-operating means comprising a link operatively connected to both said arms, the connection of one arm to said link being a lost-motion connection permitting relative movement of the two arms.

14. In a multi-record phonograph, a reciprocable magazine carrier, a record magazine removably mounted on said carrier, said magazine having a plurality of spaced transverse partitions defining compartments for the receipt of records, said carrier being provided with end walls which receive said magazine between them and locate it longitudinally of said carrier, one of said end walls being fixed and the other being pivotally mounted on the carrier, said fixed end wall being provided with an opening, said magazine being provided with a projection received in said opening to locate the magazine transversely of the carrier, yielding means biasing said pivoted end wall toward a magazine-retaining position in which it overlies the adjacent end of the magazine, and an abutment on such adjacent end of the magazine, said pivoted end wall being provided with a shoulder adapted to overlie said abutment and prevent removal of the magazine from the carrier when the pivoted end wall is in magazine-retaining position and to clear the abutment to permit removal of the magazine when the end wall is swung away from magazine-retaining position.

15. The invention set forth in claim 12 with the addition that said member is a rotatable, heart-shaped cam provided with an abutment, said magazine-reciprocating mechanism embodying a cam-follower cooperating with said cam and operatively connected to said magazine, said magazine-stopping means including an annular series of equally spaced stops selectively movable into and out of the path of movement of said abutment.

PAUL U. LANNERD.

REFERENCES CITED

The following references are of record in the file of this patent:

UNITED STATES PATENTS

| Number | Name | Date |
|---|---|---|
| Re. 21,514 | Green | July 23, 1940 |
| 1,134,603 | Gabel | Apr. 6, 1915 |
| 1,302,217 | Raney | Apr. 29, 1919 |
| 1,958,801 | Saal | May 15, 1934 |
| 2,006,048 | Jones et al. | June 23, 1935 |
| 2,161,483 | Mueller | June 6, 1939 |
| 2,205,268 | Mitchell | June 18, 1940 |
| 2,244,157 | Hokanson | June 3, 1941 |
| 2,257,019 | Brinkert | Sept. 23, 1941 |
| 2,265,840 | Hutter | Dec. 9, 1941 |
| 2,275,033 | Mitchell | Mar. 3, 1942 |
| 2,281,548 | Andrews | May 5, 1942 |
| 2,333,414 | De Tar | Nov. 2, 1943 |
| 2,360,847 | Burnham | Oct. 24, 1944 |
| 2,406,355 | Darwin et al. | Aug. 27, 1946 |

FOREIGN PATENTS

| Number | Country | Date |
|---|---|---|
| 346,763 | Great Britain | Apr. 14, 1931 |
| 381,682 | Great Britain | Oct. 13, 1932 |